April 8, 1941.   U. BARSKE   2,237,728
INDIVIDUAL AXLE DRIVE FOR RAIL VEHICLES
Filed Jan. 27, 1939
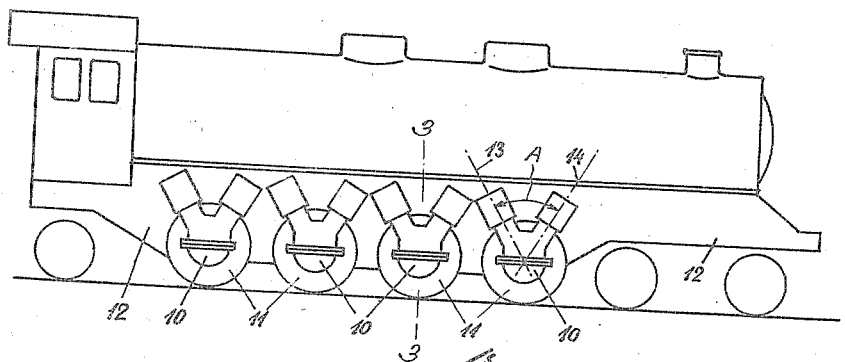
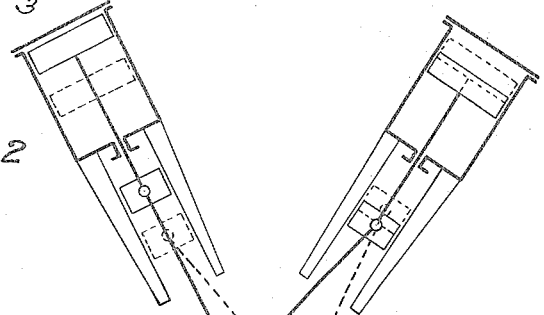
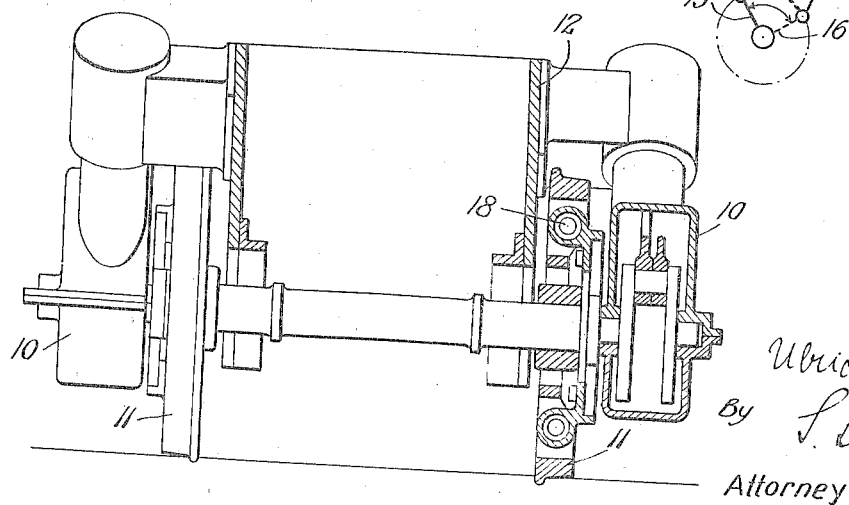
Inventor
Ulrich Barske
By S. Wray
Attorney Patented Apr. 8, 1941

2,237,728

UNITED STATES PATENT OFFICE 2,237,728

INDIVIDUAL AXLE DRIVE FOR RAIL VEHICLES

Ulrich Barske, Kassel-Harleshausen, Germany, assignor to Henschel & Sohn Gesellschaft mit beschrankter Haftung, Kassel, Germany Application January 27, 1939, Serial No. 253,167
In Germany February 2, 1938

1 Claim. (Cl. 105—37)

According to the co-pending application, Serial No. 189,986, filed February 11, 1938, in which application I am a joint applicant, a very favorable individual axle drive for rail vehicles is attained with piston engines by the employment of so-called V-engines, each having two cylinders which lie completely or approximately in one plane, are inclined with regard to one another at about 90° and act upon a common crank pin. Consideration, calculation and experiments show that the objectionable mass forces amount, with this cylinder arrangement, only to a fraction of those obtaining with other two-cylinder constructions.

The invention is based upon the knowledge gained by further calculation, that even if the most favourable angle of inclination of 90° is substantially exceeded or reduced, a substantial improvement of the balancing of masses can be attained as compared with two-cylinder engines, for instance, engines arranged in a row. As, on the other hand, satisfactory ease of starting with a single pair of cylinders is reduced in this case, the employment of V-engines with an angle of inclination of the cylinders substantially differing from 90° has to be considered primarily in connection with such vehicles which must be provided with two pairs of cylinders per driving axle, for the purpose of finding space for high powers. Ease of starting is then again fully restored by a suitable displacement of the engine cranks with regard to each other. An angle of 90° has to be considered in the first instance as the angle of displacement.

The annexed drawings show a constructional example of the invention, viz:

Fig. 1 shows the side elevation of a locomotive with drive of the individual driving axles by means of V-steam-engines.

Fig. 2 shows diagrammatically the two V-engines acting upon each axle.

Fig. 3 is a fragmentary cross-sectional view taken on line 3—3 of Fig. 1.

Each driving axle of the locomotive shown in Fig. 1 is provided with two V-steam-engines 10, which are, for instance, located in front of each driving wheel 11 in the space between the wheel and the limiting profile. The steam engines 10 are fixed upon frame 12 of the locomotive and drive the driving wheels 11 without toothed gears, directly by means of resilient clutches 18. In contradistinction to the already known individual axle drive of this kind, the cylinder axes 13, 14 of each engine are inclined at an angle A substantially different from 90°, for instance, at 60°. The objectionable effect of the gear masses is, as proved by calculations, very considerably reduced even with this cylinder inclination as compared with a locomotive having the usual driving gear, so that the running qualities of the vehicle are considerably improved. The arrangement shows otherwise all the advantages of the individual axle drive by means of V-engines: simplicity, satisfactory accessibility and, first of all, the mounting of considerable powers within a small space, more particularly in front of the driving wheel, as shown in Fig. 1. It has the further advantage that the pistons (and slides) of all the engines can be dismounted upwards. Ease of starting of each axle is assured by the crank displacement, shown in Fig. 2, of the engines acting upon an axle. The driving gear of the front pair of cylinders is shown in full lines, whilst that of the pair located behind or at the other side of the locomotive is shown by dotted lines. The cranks 15, 16 of the two engines are displaced with regard to each other by a suitable angle, generally 90°.

The illustrated and described vehicle drive with two two-cylinder V-steam engines for each driving axle can be suitably applied to any other arrangements of the engine upon the vehicle and with power transmissions by means of toothed wheel transmission.

I claim:

Driving means for direct driving connection with an axle of a rail vehicle, said driving means including a plurality of steam-operated engines arranged in pairs for individually driving the driving axles, each of said steam engines having two cylinders located approximately in one plane and inclined relatively to each other at an angle of about 60° and directed upwardly, and pistons working in said cylinders acting upon a common crank pin, the cranks of each pair of engines driving the same axle being displaced at an angle of about 90°, a pair of said engines driving the same axle adapted to be arranged respectively adjacent opposite ends of the axle.

ULRICH BARSKE.